US011009007B2

United States Patent
Bueltel et al.

(10) Patent No.: US 11,009,007 B2
(45) Date of Patent: May 18, 2021

(54) WIND POWER INSTALLATION

(71) Applicant: SSB WIND SYSTEMS GMBH & CO. KG, Salzbergen (DE)

(72) Inventors: Tobias Bueltel, Rheine (DE); Tobias Daemberg, Thuine (DE); Fabio Bertolotti, Bad Bentheim (DE)

(73) Assignee: NIDEC SSB WIND SYSTEMS GMBH, Salzbergen (DE)

( * ) Notice: Subject to any disclaimer, the term of this patent is extended or adjusted under 35 U.S.C. 154(b) by 200 days.

(21) Appl. No.: 16/070,130

(22) PCT Filed: Jan. 9, 2017

(86) PCT No.: PCT/EP2017/050316
§ 371 (c)(1),
(2) Date: Jul. 13, 2018

(87) PCT Pub. No.: WO2017/121697
PCT Pub. Date: Jul. 20, 2017

(65) Prior Publication Data
US 2019/0032637 A1    Jan. 31, 2019

(30) Foreign Application Priority Data

Jan. 16, 2016   (DE) .................... 10 2016 100 680.7

(51) Int. Cl.
F03D 7/02       (2006.01)
F03D 7/04       (2006.01)

(52) U.S. Cl.
CPC ......... *F03D 7/0224* (2013.01); *F03D 7/0264* (2013.01); *F03D 7/047* (2013.01);
(Continued)

(58) Field of Classification Search
CPC ...... F03D 7/0224; F03D 7/0264; F03D 7/047; F03D 7/02; F05B 2260/76; F05B 2260/80;
(Continued)

(56) References Cited

U.S. PATENT DOCUMENTS 6,023,399 A * 2/2000 Kogure .............. G05B 19/0421
361/115
8,933,577 B2  1/2015 Ahnert et al.
(Continued)

FOREIGN PATENT DOCUMENTS

CN    102011699 A    4/2011
CN    102287331 A    12/2011
(Continued)

OTHER PUBLICATIONS

International Search Report (in English and German) and Written Opinion of the International Searching Authority (in German with English Translation) issued in PCT/EP2017/050316, dated May 26, 2017; ISA/EP.

*Primary Examiner* — David Hamaoui
*Assistant Examiner* — Joshua R Beebe
(74) *Attorney, Agent, or Firm* — Harness, Dickey & Pierce, P.L.C.

(57) ABSTRACT

The invention relates to a wind power installation comprising a rotor (6) which can be turned with wind power, and has a rotor hub (10) and at least one rotor blade (11) rotatably mounted thereon, a higher-level operation control device (15) and a blade angle adjustment system (16) communicatively connected to same and having components that can be used for the emergency deactivation of the wind power installation, by means of which system the rotor blade (11) can be rotated relative to the rotor hub (10) and can be thereby positioned in different blade angle positions, wherein control commands (54) for the positioning of the rotor blade can be output to the blade angle adjustment system (16) by the operation control device (15), and the blade angle adjustment system (16) follows the control commands (54) in a normal operation of the wind power installation and correspondingly positions the rotor blade (11), and wherein the blade angle adjustment system (16)

(Continued)

Figure 1:
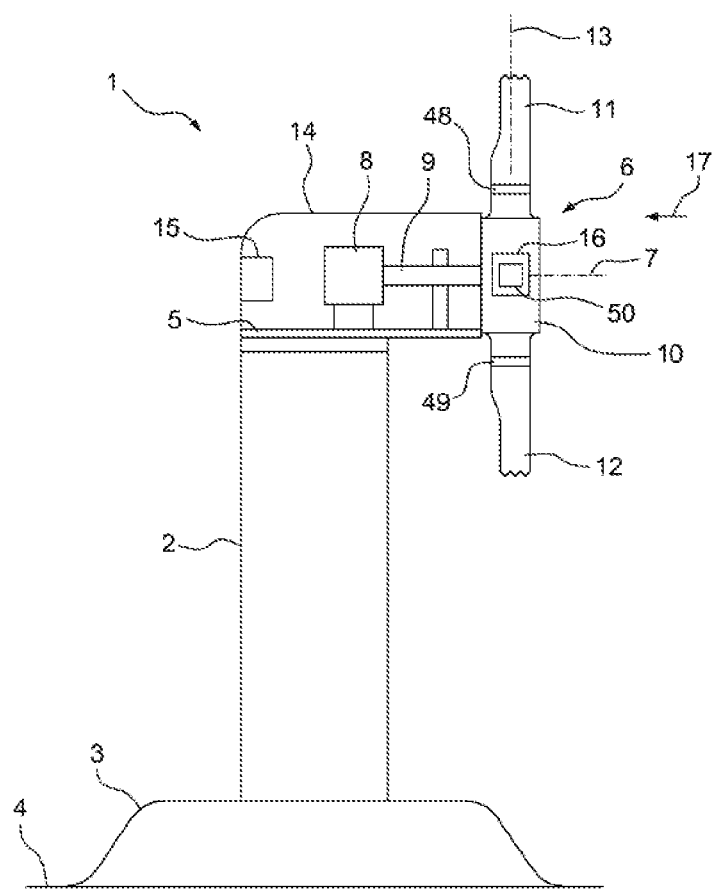

also has a monitoring unit (50) that can run in parallel to the normal operation, by means of which the functionality of the or a portion of the components can be checked.

20 Claims, 4 Drawing Sheets

(52) U.S. Cl.
CPC ....... *F05B 2260/76* (2013.01); *F05B 2260/80* (2013.01); *F05B 2260/83* (2013.01); *F05B 2270/328* (2013.01); *F05B 2270/504* (2013.01); *Y02E 10/72* (2013.01)

(58) Field of Classification Search
CPC ............ F05B 2260/83; F05B 2270/328; F05B 2270/504; F05B 2270/723; Y02E 10/723
See application file for complete search history.

(56) References Cited

U.S. PATENT DOCUMENTS

| | | | |
|---|---|---|---|
| 2004/0034810 A1* | 2/2004 | Heckmann | B60T 8/885 714/11 |
| 2007/0024227 A1 | 2/2007 | Kunkel et al. | |
| 2010/0135801 A1 | 6/2010 | Melius | |
| 2011/0181045 A1 | 7/2011 | Letas et al. | |
| 2012/0032442 A1 | 2/2012 | Wibben | |
| 2012/0063900 A1 | 3/2012 | Kestermann | |
| 2013/0088010 A1* | 4/2013 | Ahnert | F03D 7/0224 290/44 |
| 2013/0201817 A1* | 8/2013 | Jiang | H04L 41/0659 370/217 |
| 2014/0028025 A1* | 1/2014 | Ibendorf | F03D 17/00 290/44 |
| 2017/0122291 A1* | 5/2017 | Barker | F03D 7/043 |
| 2017/0175708 A1* | 6/2017 | Roesmann | F03D 7/04 |

FOREIGN PATENT DOCUMENTS

| | | |
|---|---|---|
| CN | 103032264 A | 4/2013 |
| CN | 103629048 A | 3/2014 |
| DE | 102008025944 A1 | 12/2009 |
| DE | 102009025819 A1 | 11/2010 |
| EP | 1739807 A2 | 1/2007 |
| EP | 2578876 A1 | 4/2013 |
| EP | 2589800 A1 | 5/2013 |
| JP | 2012013014 A | 1/2012 |

* cited by examiner

WIND POWER INSTALLATION

CROSS-REFERENCE TO RELATED APPLICATIONS

This application is a 371 U.S. National Stage of International Application No. PCT/EP2017/050316, filed Jan. 9, 2017, and claims priority to German Patent Application No. 10 2016 100 680.7 filed Jan. 16, 2016, the disclosures of which are herein incorporated by reference in their entirety.

The invention relates to a wind power installation with a rotor that can be turned by wind power, which has a rotor hub and at least one rotor blade rotatably mounted thereon, a higher-level operation control device and a blade angle adjustment system that can communicate therewith and that has components that can be used for an emergency shutdown of the wind power installation, by means of which the rotor blade can be rotated in relation to the rotor hub, and can thus be positioned in different blade angle positions, wherein control commands for positioning the rotor blade can be output to the blade angle adjustment system by the operation control device, and wherein the blade angle adjustment system obeys the control commands when the wind power installation is in normal operation, and positions the rotor blade accordingly. Furthermore, the invention relates to a method for checking the functionality of the components that can be used for an emergency shutdown of the wind power installation.

For an emergency shutdown of a wind power installation, it is placed in a safe state in that one or more rotor blades are rotated to a defined blade angle position about their blade axes by a blade angle adjustment system (pitch system). The safe state can normally only be reached when at least one rotor blade can be rotated to the defined blade angle position, which is also referred to as a safe blade angle position or as a wind-vane position. With various disruptions, e.g. power failures or excessive rotation speeds of the rotor, it must be possible to reach this safe state in any conditions. The command to assume this state is received by the pitch system in the form of at least one emergency shutdown control signal, which is referred to in particular as an EFC signal (Emergency Feather Command). This signal can also be provided in the form of numerous redundant signals. In particular, this signal is provided in at least one or more, instances.

In some circumstances components (e.g. parts, circuit components) of the system are necessary during the emergency shutdown (EFC operation) that are not used in normal blade angle adjustment operation, and thus cannot be checked for functionality and availability. According to the current guidelines and regulations, however, it is required that it be possible to continuously determine the availability and functionality of the safety mechanisms. For this reason, the EFC operation is initiated in cycles by the higher-level operation control device of the wind power installation. In response to this command, all of the blades of the wind power installation may be rotated about their blade axes at a defined speed and in a defined direction, and are first allowed to stop when the stop switch has been actuated. The stop switch, or the redundant stop switches are mechanically attached such that the actuation thereof takes place when the safe state has been reached. The higher-level operation control device observes the behavior of the pitch system during the EFC operation, and draws a conclusion therefrom regarding the functionality. The frequency of the cyclical shutdowns of the wind power installation varies in practice, but is normally in the range of ca. once per week.

For reasons of redundancy, normally two stop switches are attached to each rotor blade, wherein the second stop switch is only switched or actuated when the first stop switch fails. The wind power installation normally cannot automatically leave the blade angle positions assigned to the second stop switches with its rotor blades, such that a technician must first repair the damage to the first stop switch on site, and subsequently manually place the installation in operation. The methods for the cyclical shutdown thus only cover the testing of the first stop switch, wherein the installation is irrevocably stopped at the second stop switch when the first stop switch fails during the test.

The respective converter or the respective control for each axis detects the respective blade angle via one or more rotary angle transmitters or sensors, e.g. absolute value transmitters. With a feedback of numerous blade angle values, shaft breakages, for example, can thus be checked, or a reciprocal plausibility check can be carried out with the redundant angle data. In the current state of development, pitch systems are frequently configured such that the blade angle adjustment is carried out via a converter that has a capacitive intermediate circuit, in order to always be able to ensure a regulated operation, and to avoid unnecessary blade loads. The intermediate circuit is connected to the mains via a controlled or uncontrolled rectifier, and to an electric energy storage unit via a diode. In earlier systems that had self-commutating DC motors, it was possible to implement the EFC operation directly by means of a battery.

In order to prepare for the worst case during the cyclical testing of the safety function, a power outage must be simulated, such that the pitch system is supplied with power from the electric energy storage unit. It is ensured in this manner that the pitch system is operated using all of the switches, parts and components necessary for a safe shutdown. As mentioned above, the safety functions are checked in that an EFC command is initiated by the upper-level operation control device in the form of a test. As a result, the entire wind power installation is stopped for this test.

Over the course of the test and beyond, until reaching the operating state, the wind power installation may not generate any energy, or it may generate substantially less energy. The technical installation availability is thus reduced for this period of time, which has a direct effect on the financial rewards. The calculated availability of a wind power installation is to be regarded within a time frame agreed to in advance. A distinction is to be made thereby between a planned stoppage and an unplanned stoppage. The planned stoppages are deducted in advance from the overall commercial runtime. A further disadvantage is that there is a higher load placed on the wind power installation during the emergency shutdown. Because this cyclically increased load results in increased wear, it can be assumed that this also results in higher costs and expenditures during maintenance, servicing and upkeep of the wind power installation.

DE 10 2008 025 944 A1 discloses a wind power installation with a rotor, a generator for generating electrical energy driven by the rotor, wherein the rotor has at least one blade that can be adjusted by means of a pitch mechanism, and the pitch mechanism comprises an energy supply unit with a battery and an actuator, as well as a control unit. A load module is provided, which switches the actuator between an operating mode and a testing mode, wherein, when the actuator is in the testing mode, it forms a defined load for the battery that can be selected in advance. The actuator comprises a converter and a DC motor, wherein the load control module is configured to supply a predefinable current to the DC motor, which corresponds to the defined load. Furthermore, a discharge control module is provided, which reduces the voltage acting on the actuator to a predefined voltage level at the start of the test. In particular, the intermediate circuit is discharged to the battery voltage level for this. A battery monitor is also provided, which monitors the battery, in particular with regard to its voltage state.

The load module switches the actuator between an operating mode and a testing mode, such that the actuator cannot function in the normal operation when in the testing mode.

Based on this, the fundamental object of the invention is to create a possibility for testing the functionality of components that can be used for an emergency shutdown of a wind power installation when in its normal operating state.

This is achieved according to the invention by a wind power installation according to claim 1, and by a method according to claim 11. Preferred further developments of the invention are defined in the dependent claims and the following description.

The wind power installation specified in the introduction, with a rotor that can be turned with wind power, which has a rotor hub and at least one rotor blade rotatably mounted thereon, a higher-level operation control device, and a blade angle adjustment system that can communicate therewith and has components that can be used for an emergency shutdown of the wind power installation, by means of which the rotor blade can rotate in relation to the rotor hub, and can thus be positioned in different blade angle positions, wherein the control commands for positioning the rotor blade can be output to the blade angle adjustment system by the operation control device, and wherein the blade angle adjustment system obeys the control commands when the wind power installation is in normal operation, and positions the rotor blade accordingly, is further developed according to the invention in that the blade angle adjustment system also has a monitoring unit that can run in parallel to the normal operation, by means of which the functionality of the components, or a portion thereof, can be checked.

Because the monitoring unit can run parallel to the normal operation, the functionality of the components or a portion thereof can be checked by means of the monitoring unit in the normal operation thereof, and/or in parallel to the normal operation thereof. By way of example, the rotor blade rotates in relation to the rotor hub in normal operation, and/or the rotor blade is rotated in relation to the rotor hub, in particular by means of the blade angle adjustment system. Preferably, data regarding the results of the testing can be output to the operation control device by means of the monitoring unit, in particular when in normal operation, and/or in parallel to the normal operation.

The blade angle adjustment system is preferably provided on and/or attached to, or inside, the rotor. The operation control device is preferably external to the rotor. In particular, the wind power installation has a machine mount, on which the rotor is rotatably mounted. The operation control device is preferably provided on and/or attached to the machine mount. The blade angle adjustment system can preferably be rotated together with the rotor in relation to the operation control device. The rotor advantageously rotates in relation to the machine mount in normal operation, and/or the rotor is advantageously rotated in relation to the machine mount in normal operation, in particular by wind power. In normal operation, the blade angle adjustment system preferably rotates with the rotor in relation to the operation control device. The operation control device is preferably connected to the blade angle adjustment system, in particular by one or more communication lines. The communication lines comprise rotary transmitters or slip rings, by way of example. The wind power installation preferably comprises an electric generator, which is mechanically connected to the rotor. The generator is preferably provided on and/or attached to the machine mount. In particular, the electric generator can be, or is driven by the rotor.

According to a further development, when an error in the functionality of at least one of the components is detected by the monitoring unit, the blade angle adjustment system can be activated by the operation control device to rotate the rotor blade to a safe blade angle position. This is useful because, when an error has been detected, reaching the safe blade angle position is no longer ensured in an emergency. When the rotor blade is in the safe blade angle position, it is preferably oriented in the direction of the wind and/or parallel to the direction of the wind. The safe blade angle position is also referred to as a wind-vane position, by way of example.

According to a further development, the operation control device is connected to the blade angle adjustment system by one, or at least one, emergency shutdown control line, via which one, or at least one, emergency shutdown control signal is output to the blade angle adjustment system by the operation control device. The components preferably comprise the emergency shutdown control line. Furthermore, the blade angle adjustment system comprises, in particular, an emergency shutdown control signal input, to which the emergency shutdown control signal can be transmitted. The emergency shutdown control line is preferably connected to the emergency shutdown control signal input. The components preferably also comprise the emergency shutdown control signal input. In particular, the emergency shutdown control signal can be checked for errors by means of the monitoring unit for testing the functionality of the emergency shutdown control line and/or the emergency shutdown control signal input when in normal operation. The emergency shutdown control signal can be a DC signal, or a DC voltage signal. By way of example, the emergency shutdown control signal has a first level in normal operation, and changes to a second level when an emergency shutdown of the wind power installation is to take place. The first level is an H-level or an L-level, for example. Furthermore, the second level is and L-level or H-level, for example. There is a risk thereby, however, that the emergency shutdown control signal remains permanently at the first level due to an impairment in the functionality, and can no longer change to the second level. The emergency shutdown control signal is preferably a periodic and/or pulsed signal with a defined frequency. The blade angle adjustment system and/or the monitoring unit and/or the emergency shutdown control signal input advantageously comprises a frequency detection device, by means of which the frequency of the emergency shutdown control signal can be detected. The monitoring unit is preferably connected to the emergency shutdown control signal input and/or the frequency detection device. In particular, the frequency of the emergency shutdown control signal can be detected by means of the monitoring unit. The frequency, or at least the frequency of the emergency shutdown control signal can preferably be checked, in particular by means of the monitoring unit, in order to check the functionality of the emergency shutdown control line and/or the emergency shutdown control signal input in normal operation by means of the monitoring unit. An error in the emergency shutdown control signal occurs in particular when it remains absent, or its frequency differs from the defined frequency to or beyond a predefined extent. An error in the emergency shutdown control line and/or in the emergency shutdown control signal input can be detected through an error in the emergency shutdown control signal for example. As a result, the aforementioned functionality impairment can also be detected. The emergency shutdown control line comprises, e.g., at least one rotary transmitter or slip ring, or is guided over at least one rotary transmitter or slip ring.

According to one design, the blade angle adjustment system comprises one, or at least one, converter, and one, or at least one, electric motor connected downstream of the converter, and mechanically connected to the rotor blade. The blade angle adjustment system preferably also comprises one, or at least one, rotational angle indicating device, by means of which the blade angle position of the rotor blade can be detected. The monitoring unit is preferably connected to the rotational angle indicating device. In particular, the blade angle position of the rotor blade can be detected by means of the monitoring unit. In particular, the electric motor is connected electrically to the converter, preferably via electric motor connection lines. The components preferably comprise the converter and/or the electric motor and/or the mechanical connection provided between the electric motor and the rotor blade, and/or the motor connection lines. In particular, the blade angle position of the rotor blade can be checked for changes by means of the monitoring unit, in order to test the functionality of these components in normal operation. When the blade angle position of the rotor blade changes during normal operation, it can be assumed that the converter and/or the electric motor and/or the mechanical connection provided between the electric motor and the rotor blade and/or the motor connection lines, are functional. The blade angle adjustment system preferably also comprises a control unit, by means of which the converter in particular can be controlled. The control unit is advantageously connected to the converter. The aforementioned components preferably also comprise the control unit, in addition to the converter and/or the electric motor and/or the mechanical connection provided between the electric motor and the rotor blade and/or the motor connection lines. In particular, the monitoring unit is connected to the control unit. The control unit can preferably be controlled by means of the monitoring unit. The monitoring unit is preferably connected to the converter. In particular, the converter can be controlled by means of the monitoring unit, e.g. directly or through the control unit. The control unit preferably comprises the monitoring unit or a portion of the monitoring unit. The rotational angle indicating device advantageously comprises one, or at least one, rotational angle indicator, by means of which the blade angle position of the rotor blade can be detected. The rotational angle position of a motor shaft of the electric motor and/or the rotational angle position or the blade angle position of the rotor blade can be detected, e.g. by means of the rotational angle indicator.

The electric motor is preferably an asynchronous motor, a servomotor, a DC motor, or a synchronous motor, e.g. a permanent magnet synchronous motor. The electric motor comprises in particular the, or a, motor shaft, which is preferably mechanically connected to the rotor blade, in particular with one, or at least one, gearing incorporated therebetween. The rotor blade is preferably rotatably mounted on the rotor hub by means of a blade bearing. The mechanical connection provided between the electric motor and the rotor blade comprises, e.g., the motor shaft and/or one or more shafts of the gearing and/or the gearing, and/or the blade bearing. One or more current interrupting elements can be interconnected in the motor connection lines, e.g. protectors or relays. The gearing comprises, e.g. a pinion and a sprocket, which is combed by the pinion and/or engages therewith. The pinion is preferably rigidly connected to the motor shaft for conjoint rotation therewith. The sprocket is preferably rigidly connected to the rotor blade or the rotor hub for conjoint rotation therewith.

According to a further development, the rotational angle indicating device comprises two, or at least two, rotational angle indicators, by means of which the blade angle positions of the rotor blades can be detected independently of one another. In particular, the monitoring unit is connected to each of the rotational angle indicators. The blade angle positions of the rotor blades detected by each of the rotational angle indicators can advantageously be detected by means of the monitoring unit. The components preferably comprise the rotational angle indicating device. In particular, the rotational angle positions and/or blade angle positions detected for checking the functionality of the rotational angle indicating device in normal operation by means of the monitoring unit can be compared with one another and/or tested for plausibility. There is error in the rotational angle indicating device in particular when the blade angle positions detected by the different rotational angle indicators differ from one another beyond a predefined extent. The rotational angle position of the motor shaft can be detected, e.g. by means of a first rotational angle indicator, and the rotational angle position or blade angle position of the rotor blade can be detected, e.g. by means of a second rotational angle indicator.

The blade angle adjustment system preferably comprises one, or at least one, end switch that can be actuated by the rotor blade when the safe blade angle position has been reached, the actuation of which enables the electric motor to be shut down. The end switch is advantageously formed by the rotational angle indicating device. Such an end switch can also be referred to, e.g., as a software end switch. By checking the functionality of the rotational angle indicating device, the functionality of the end switch, in particular, can also be checked by means of the monitoring unit. The aforementioned end switch is also preferably referred to as the first end switch. The blade angle adjustment system preferably comprises one, or at least one, second end switch that can be actuated when the safe blade angle position, or a blade angle position offset thereto, has been reached, by means of which the electric motor can be shut down. The second end switch can preferably be actuated mechanically by the rotor blade. The second end switch is a safety switch, in particular in case the first end switch malfunctions.

According to one design, the blade angle adjustment system comprises one, or at least one, electric energy storage unit. Preferably, the converter comprises an input stage, an intermediate circuit connected downstream of the input stage, and an output stage connected downstream of the intermediate circuit. The electric energy storage unit is connected in particular to the intermediate circuit. The input stage is advantageously connected to an electrical power supply and/or connected downstream thereof. In particular, the input stage and/or the converter can be supplied with electric energy by the electrical power supply. The electrical power supply is formed, e.g. by an electrical network, e.g. a wind power installation network, a wind farm network, or by the public power supply network. In particular, the electrical power supply has multiple phases, in particular three phases. The monitoring unit is advantageously connected to the input stage. The input stage can preferably be activated by means of the monitoring unit, e.g. directly, or by the control unit interconnected therebetween. The electric motor is preferably connected to the output stage and/or connected downstream thereof. The monitoring unit is advantageously connected to the output stage. The output stage can preferably be controlled by means of the monitoring unit, e.g. directly or by the control unit interconnected therebetween. The blade angle adjustment system and/or the converter preferably comprise an intermediate circuit voltage detection device, by means of which an electric intermediate circuit voltage applied to the intermediate circuit can be detected. In particular, the monitoring unit is connected to the intermediate circuit voltage detection device. The components advantageously comprise the energy storage unit. In particular, the input stage can be activated to reduce the intermediate circuit voltage from an intermediate circuit nominal voltage to a lower, in particular predefined, testing voltage for checking the functionality of the energy storage unit in normal operation by means of the monitoring unit, which testing voltage is lower than a predefined minimum voltage assigned to the energy storage unit, and the intermediate circuit voltage can be compared to the minimum voltage. Because the testing voltage is lower than the minimum voltage for the energy storage unit, the intermediate circuit is supplied with voltage by the energy storage unit, as long as the energy storage unit is connected to the intermediate circuit and is functional. If the detected intermediate circuit voltage is greater than or equal to the minimum voltage for the energy storage unit, the energy storage unit is present and functional. Furthermore, the electrical connection between the energy storage unit and the intermediate circuit is functional. If, in contrast, the detected intermediate circuit voltage is equal to the testing voltage or lower than the minimum voltage for the energy storage unit, the energy storage unit is not functional and/or the electrical connection between the energy storage unit and the intermediate circuit is not functional. The components thus also preferably comprise the electrical connection between the energy storage unit and the intermediate circuit.

The input stage is a rectifying input state or a rectifier, in particular, preferably a controllable rectifier. The intermediate circuit is preferably a DC voltage intermediate circuit and/or a DC intermediate circuit. In particular, the intermediate circuit comprises an intermediate circuit capacitor. The output stage is preferably a transistor output stage. By way of example, the output stage forms an inverter and/or a pulse width modulator.

The electric energy storage unit is connected to the intermediate circuit, in particular via one, or at least one, rectifier component, e.g. one, or at least one, diode. The electrical connection preferably comprises the at least one rectifier component between the energy storage unit and the intermediate circuit. The energy storage unit advantageously comprises at least one, in particular rechargeable, battery, and/or at least one capacitor. The rechargeable batter is also referred to as an accumulator, for example.

The testing voltage is preferably not equal to zero. The testing voltage is advantageously greater than zero. The testing voltage is preferably high enough that the converter and/or the electric motor can also be operated with the testing voltage applied to the intermediate circuit. The converter and/or the electric motor can thus be operated with the testing voltage in particular. This is accompanied by the advantage that normal operation can be maintained when checking the functionality of the energy storage unit, in particular also when the energy storage unit and/or the electrical connection between the energy storage unit and the intermediate circuit is non-functional. If the intermediate circuit voltage is lower than the minimum voltage for the energy storage unit and/or the intermediate circuit voltage corresponds to the testing voltage, an error is preferably reported to the operation control device by means of the monitoring unit, and/or the activation of the input stage for reducing the intermediate circuit voltage is terminated, which in turn reassumes its nominal voltage, in particular.

According to a further development, the blade angle adjustment system comprises an energy storage voltage detection device, by means of which an electric energy storage unit voltage output by the energy storage unit can be detected. The monitoring unit is preferably connected to the energy storage unit voltage detection device. The energy storage unit voltage can advantageously be detected by means of the monitoring unit. The monitoring unit is preferably connected to the electric motor. The electric motor can advantageously be controlled by means of the monitoring unit, e.g. directly or by interconnecting the control unit and/or the converter and/or the output stage. In particular, in order to check the functionality of the energy storage unit in normal operation by means of the monitoring unit the output stage can be activated such that the energy storage unit can be electrically loaded via the converter with the electric motor, preferably without any, or without substantial changes to the mechanical output thereof, in particular in normal operation and/or currently, while the input stage is activated by the monitoring unit to reduce the intermediate circuit voltage to the testing voltage, the discharging of the energy storage unit, in particular on the basis of the intermediate circuit voltage and/or the energy storage unit voltage, can be observed, at least one datum can be formed from the observation of the discharging that is characteristic of the current state of the electric energy storage unit, and the datum and/or the current state of the energy storage unit can be compared with the predefined requirements for the state of the energy storage unit and/or with a predefined target state of the energy storage unit. As a result, the state of the energy storage unit can be checked.

The current state of the electric energy storage unit and/or the datum characteristic of the current state of the electric energy storage unit preferably comprise the SoC (state of charge) of the energy storage unit and/or the SoH (state of health) of the energy storage unit. In particular, the predefined requirements for the state of the electric energy storage unit and/or the predefined target state of the energy storage unit comprise a predefined target SoC for the energy storage unit and/or a predefined target SoH for the energy storage unit. If the current state of the energy storage unit does not correspond to the predefined requirements or the target state and/or if the current state of the energy storage unit differs from the predefined requirements or the target state to more than a predefined extent, an error is preferably reported to the operation control device by means of the monitoring unit.

According to one design, one or more electric motor voltages applied to the electric motor can be modulated by means of the monitoring unit, in particular when the control unit and/or the output stage is interconnected therebetween, such that a defined electric load to the energy storage unit can be obtained, preferably without, or without substantial, changes to the mechanical performance output by the electric motor, and/or the torque output by the electric motor, and/or the rotational rate of the electric motor, in particular in normal operation and/or currently. The expression, "without, or without substantial, changes to the mechanical performance output by the electric motor" thus means in particular without, or without substantial changes to the torque output by the electric motor and/or the rotational rate of the electric motor. One or more motor currents that can be supplied to the electric motor to generate the defined electrical load to the energy storage unit can be generated in the motor, in particular by the modulation of the motor voltages. The energy storage unit current detection device is preferably an intermediate circuit current detection device, by means of which the current flowing in the intermediate circuit (intermediate circuit current) can be detected. Alternatively, the energy storage unit current detection device is, e.g. a motor current detection device, by means of which the motor current(s) supplied and/or generated in the electric motor can be detected.

According to a further development, the blade angle adjustment system comprises at least one brake that can be electrically actuated, by means of which the rotor blade can be fixed in place and/or braked with regard to its rotation in relation to the rotor hub. The blade angle adjustment system preferably also comprises a brake control device, by means of which the brake can be controlled. The brake control device can preferably be controlled by means of the control unit. According to one design, the brake control device is integrated in the control unit. The brake can preferably be controlled by the control unit, in particular when the brake control device is interconnected therebetween. The brake is preferably connected to the brake control device and/or the control unit via electrical brake connection lines. The components preferably comprise the brake and/or the brake control device and/or the brake connection lines. The blade angle adjustment system preferably comprises a brake current detection device, by means of which an electric brake current supplied to the brake can be detected. The monitoring unit is preferably connected to the brake current detection device. In particular, the brake current can be detected by means of the monitoring unit. In order to check the functionality of the brake and/or the brake control device and/or the brake connection lines in normal operation by means of the monitoring unit, the, or one of, the electric brake currents supplied to the brake, and/or a temporal curve of the brake current, can be tested for plausibility. If the brake current and/or the curve of the brake current is not plausible, then there is an error in the brake and/or in the brake control device and/or in the brake connection lines. The blade angle position of the rotor blade can preferably be checked for changes in the fixed state of the rotor blade by the brake for checking the functionality of the brake and/or the brake control device and/or the brake connection lines in normal operation by means of the monitoring unit, in particular by means of the rotational angle indicating device. If a change is detected in the blade angle position of the rotor blade in the fixed state of the rotor blade by the brake, then there is an error, in particular in the brake and/or in the brake control device and/or in the brake connection lines. The brake connection lines comprise, e.g., one or more current interrupting elements, e.g. protectors or relays. The brake is preferably an electro-mechanical brake. In particular, the brake is a retention brake. If there is an error in the brake and/or in the brake control device and/or in the brake connection lines, an error is preferably reported to the operation control device by means of the monitoring unit.

The invention also relates to a method for checking the functionality of components that can be used for an emergency shutdown of a wind power installation, which comprises a rotor that can be or is turned by wind power, which has a rotor hub and at least one rotor blade rotatably supported thereon, a higher level operation control device, and a blade angle adjustment system in communication therewith and comprising the components, by means of which the rotor blade can be or is rotated in relation to the rotor hub, and thus can be or is placed in different blade angle positions, wherein control commands for positioning the rotor blade are output to the blade angle adjustment system by the operation control device, wherein the blade angle adjustment system obeys the control commands in a normal operation of the wind power installation and positions the rotor blade accordingly, and wherein the blade angle adjustment system also has a monitoring unit running parallel to the normal operation, by means of which the functionality of one or some of the components is checked.

The wind power installation specified in conjunction with the method is preferably the wind power installation according to the invention. The method can be further developed in accordance with all of the designs explained in conjunction with the wind power installation according to the invention. Furthermore, the wind power installation according to the invention can be further developed in accordance with all of the designs explained in conjunction with the method. The method is preferably carried out in or by means of the wind power installation according to the invention. In particular, the wind power installation according to the invention is used for executing the method.

Because the monitoring unit runs in parallel to normal operation according the method, the functionality of one or some of the components is checked by means of the monitoring unit, in particular in normal operation and/or parallel to normal operation. A datum regarding the results of the check is preferably transmitted to the operation control device by or by means of the monitoring unit, in particular in, and/or parallel to, normal operation. By way of example, the rotor blade rotates in relation to the rotor hub and/or the rotor blade is rotated in relation to the rotor hub in normal operation, in particular by means of the blade angle adjustment system.

According to one design, when an error has been detected in the functionality of at least one of the components by the monitoring system, the blade angle adjustment system is activated by the operation control device for rotating the rotor blade into the, or a, safe blade angle position.

According to a further development, the operation control device is connected to the blade angle adjustment system by one, or at least one, emergency shutdown control line, via which one, or at least one, emergency shutdown control signal is output to the blade angle adjustment system by the operation control device. The components preferably comprise the emergency shutdown control line. The blade angle adjustment system also comprises, in particular, an emergency shutdown control input, to which the emergency shutdown control signal is transmitted. The emergency shutdown control line is preferably connected to the emergency shutdown control signal input. The components also preferably comprise the emergency shutdown control signal input. In particular, the emergency shutdown control signal is checked for errors in order to check the functionality of the emergency shutdown control line and/or the emergency control signal input in normal operation by means of the monitoring unit. The emergency shutdown control signal is preferably a periodic signal with a defined frequency. The blade angle adjustment system and/or the monitoring unit and/or the emergency shutdown control signal input advantageously comprise a frequency detection device, by means of which the frequency of the emergency shutdown control signal is detected. The monitoring unit is preferably connected to the emergency shutdown control signal input and/or the frequency detection device. In particular, the frequency of the emergency shutdown control signal is detected by means of the monitoring unit. The frequency, or at least the frequency, of the emergency shutdown control signal is preferably checked, in particular by means of the monitoring unit, in order to check the functionality of the emergency shutdown control line and/or the emergency shutdown control signal input in the normal operation by means of the monitoring unit. There is error in the emergency shutdown control signal in particular when it fails to arrive, or its frequency differs from the defined frequency to more than a predefined extent.

According to one design, the blade angle adjustment system comprises one, or at least one, converter and one, or at least one, electric motor, connected downstream of the converter, and mechanically connected to the rotor blade. The blade angle adjustment system also preferably comprises one, or at least one, rotational angle indicating device, by means of which the blade angle position of the rotor blade is detected. The monitoring unit is preferably connected to the rotational angle indicating device. In particular, the blade angle position of the rotor blade is detected by means of the monitoring unit. The electric motor is connected to the converter, in particular electrically, preferably via electric motor connection lines. The components preferably comprise the converter and/or the electric motor and/or the mechanical connection provided between the electric motor and the rotor blade and/or the motor connection lines. In particular, the blade angle adjustment system of the rotor blade is checked for changes by means of the monitoring unit in normal operation in order to check the functionality of these components. The blade angle adjustment system also preferably comprises a control unit, by means of which the converter in particular is controlled. The aforementioned components also preferably comprises the control unit, in addition to the converter and/or the electric motor and/or the mechanical connection provided between the electric motor and the rotor blade and/or the motor connection lines. In particular, the monitoring unit is connected to the control unit. The control unit can preferably by controlled by means of the monitoring unit. The monitoring unit is preferably connected to the converter. In particular, the converter can be controlled by means of the monitoring unit, e.g. directly or by means of the control unit interconnected therebetween. The control unit preferably comprises the monitoring unit or a portion of the monitoring unit. The rotational angle indicating device advantageously comprises one, or at least one, rotational angle indicator, by means of which the blade angle position of the rotor blade is detected. The rotational angle indicator detects, e.g. the rotational angle position of a motor shaft of the electric motor and/or the rotational angle position or blade angle position of the rotor blade.

The electric motor is preferably an asynchronous motor, a servomotor, a DC motor, or a synchronous motor, e.g. a permanent magnet synchronous motor. In particular, the electric motor comprises the, or a, motor shaft, which is preferably mechanically connected to the rotor blade, in particular by interconnection through one, or at least one, gearing. The rotor blade is preferably rotatably mounted on the rotor hub by means of a blade bearing. The mechanical connection provided between the electric motor and the rotor blade comprises, e.g. the motor shaft and/or one or more shafts of the gearing and/or the gearing and/or the blade bearing. The motor connection lines comprise, e.g. one or more current interrupting elements, e.g. protectors or relays. The gearing comprises, e.g. a pinion and a sprocket combed by the pinion, and/or engaging therewith. The pinion is preferably rigidly connected to the motor shaft for conjoint rotation therewith. The sprocket is preferably rigidly connected to the rotor blade or the rotor hub for conjoint rotation therewith.

According to a further development, the rotational angle indicating device comprises two, or at least two, rotational angle indicators, by means of which the blade angle position of the rotor blade is detected, independently of one another. In particular, the monitoring unit is connected to each rotational angle indicator. Advantageously, the monitoring unit can detect the blade angle position of the rotor blade detected by each of the rotational angle indicators. The components preferably comprise the rotational angle indicating device. In particular, the rotational angle positions and/or the blade angle positions detected by the different rotational angle indicators are compared with one another and/or checked for plausibility in order to check the functionality of the rotational angle indicating device in normal operation by means of the monitoring unit. A first rotational angle indicator detects, e.g., the rotational angle position of the motor shaft, and a second rotational angle indicator detects, e.g. the rotational angle position or blade angle position of the rotor blade.

The blade angle adjustment system preferably comprises one, or at least one, end switch that can be actuated by the rotor blade when it reaches a safe blade angle position, the actuation of which results in a shutdown of the electric motor. The end switch is advantageously formed by the rotational angle indicating device. By checking the functionality of the rotational angle indicating device, the functionality of the end switch, in particular, is thus also checked. The aforementioned end switch is preferably also referred to as the first end switch. The blade angle adjustment system preferably comprises one, or at least one, second end switch, which can be actuated by the rotor blade when it reaches the safe blade angle position or a blade angle position offset thereto, the actuation of which results in a shutdown of the electric motor. The second end switch can preferably be actuated mechanically by the rotor blade.

According to one design, the blade angle adjustment system comprises one, or at least one, electric energy storage unit. The converter preferably comprises an input stage, an intermediate circuit connected downstream of the input stage, and an output stage connected downstream of the intermediate circuit. In particular, the electric energy storage unit is connected to the intermediate circuit. The input stage is advantageously connected to an electrical power supply, and/or connected downstream thereof. In particular, the input stage and/or the converter are supplied with electrical energy by the electrical power supply. The electrical power supply is, e.g. formed by an electrical network, e.g. a wind power installation network, a wind farm network, or by the public power supply network. In particular, the electrical power supply has multiple phases, e.g. three phases. The monitoring unit is advantageously connected to the input stage. The input stage can preferably be controlled by means of the monitoring unit, e.g. directly, or by the control unit interconnected therebetween. The electric motor is preferably connected to the output stage, or connected downstream thereof. The monitoring unit is advantageously connected to the output stage. The output stage can preferably be connected by means of the monitoring unit, e.g. directly, or by means of the control unit interconnected therebetween. The blade angle adjustment system and/or the converter preferably comprise an intermediate circuit voltage detection device, by means of which an electrical intermediate circuit voltage applied to the intermediate circuit is detected.

The monitoring unit is connected in particular to the intermediate circuit voltage detection device. The intermediate circuit voltage is preferably detected by means of the monitoring unit. The components preferably comprise the energy storage unit. In particular, the input stage is activated to reduce the intermediate circuit voltage form an intermediate circuit nominal voltage to a lower, in particular predefined, testing voltage, which is lower than a predefined minimum voltage assigned to the energy storage unit, and the intermediate circuit voltage is compared with the minimum voltage, in order to check the functionality of the energy storage unit in normal operation by means of the monitoring unit. The components also preferably comprise the, or an, electrical connection between the energy storage unit and the intermediate circuit.

The input stage is a rectifying input stage or a rectifier in particular, preferably a controlled rectifier. The intermediate circuit is preferably a DC voltage intermediate circuit and/or a DC intermediate circuit. In particular, the intermediate circuit comprises an intermediate circuit capacitor. The output stage is preferably a transistor output stage. By way of example, the output stage forms an inverter and/or a pulse width modulator.

The electric energy storage unit is connected to the intermediate circuit, in particular via one, or at least one, rectifying component, e.g. one, or at least one, diode. The electrical connection preferably comprises the at least one rectifier component between the energy storage unit and the intermediate circuit. The energy storage unit advantageously comprises at least one, in particular rechargeable, battery and/or at least one capacitor. The rechargeable battery is referred to, e.g. as an accumulator.

The testing voltage is preferably not equal to zero. The testing voltage is advantageously greater than zero. The testing voltage is preferably high enough that the converter and/or the electric motor can also be operated with testing voltage applied to the intermediate circuit. The converter and/or the electric motor can thus be operated in particular with the testing voltage. If the intermediate circuit voltage is lower than the minimum voltage of the energy storage unit and/or the intermediate circuit voltage corresponds to the testing voltage, an error is preferably reported to the operation control unit by means of the monitoring unit, and/or activation of the input stage for reducing the intermediate circuit voltage is terminated, which subsequently reassumes its nominal voltage in particular.

According to a further development, the blade angle adjustment system and/or the converter comprise an energy storage unit current detection device, by means of which an energy storage unit current output by the energy storage unit is detected. The monitoring unit is preferably connected to the energy storage unit current detection device. The energy storage unit current is advantageously detected by means of the monitoring unit. The monitoring unit is preferably connected to the electric motor. The electric motor can advantageously be controlled by means of the monitoring unit, e.g. directly, or by the control unit and/or the converter and/or the output stage interconnected therebetween. In particular, for a supplementary checking of the functionality of the energy storage unit in normal operation by means of the monitoring unit the output stage is activated such that the energy storage unit is electrically loaded via the converter with the electric motor, preferably without, or without substantial, changes thereto, in particular in normal operation and/or currently output mechanical performance, while the input stage is activated by the monitoring unit for reducing the intermediate circuit voltage to the testing voltage, the discharging of the energy storage unit is observed, in particular on the basis of the intermediate circuit voltage and/or the energy storage unit current, at least one datum characteristic of the current state of the electric energy storage unit is formed from the observation of the discharging, and the datum and/or the current state of the energy storage unit is compared with the predefined requirements for the state of the energy storage unit and/or with a predefined target state of the energy storage unit. The state of the energy storage unit is checked by this means. The current state of the electric energy storage unit and/or the data that is characteristic of the current state of the electric energy storage unit preferably comprises the SoC (state of charge) of the energy storage unit and/or the SoH (state of health) of the energy storage unit. In particular, the predefined requirements for the state of the electric energy storage unit and/or the predefined target state of the energy storage unit preferably comprise a predefined target SoC of the energy storage unit and/or a predefined target SoH of the energy storage unit. If the current state of the energy storage unit does not correspond to the predefined requirements or the target state and/or if the current state of the energy storage unit differs from the predefined requirements or the target state to more than a predefined extent, an error is preferably reported to the operation control unit by means of the monitoring unit.

According to one design, one or more electric motor voltages applied to the electric motor are modulated by means of the monitoring unit, in particular with the control unit and/or the output stage interconnected therebetween, such that a defined electric load to the energy storage unit is obtained without, or without substantial, changes to the mechanical performance output by the electric motor, and/or the torque output by the electric motor, and/or the rotational rate of the electric motor, in particular in normal operation and/or currently. The expression, "without, or without substantial, changes to the mechanical performance output by the electric motor" thus means in particular without, or without substantial, changes to the torque output by the electric motor and/or the rotational rate of the electric motor. One or more motor currents that can be supplied to the electric motor to generate the defined electrical load to the energy storage unit can be generated in the motor, in particular by the modulation of the motor voltages. The energy storage unit current detection device is preferably an intermediate circuit current detection device, by means of which the current flowing in the intermediate circuit (intermediate circuit current) can be detected. Alternatively, the energy storage unit current detection device is, e.g. a motor current detection device, by means of which the motor current(s) supplied and/or generated in the electric motor can be detected.

According to a further development, the blade angle adjustment system comprises at least one brake that can be electrically actuated, by means of which the rotor blade can be fixed in place and/or braked with regard to its rotation in relation to the rotor hub. The blade angle adjustment system preferably also comprises a brake control device, by means of which the brake is controlled. The brake control device is preferably controlled by means of the control unit. According to one design, the brake control device is integrated in the control unit. The brake is preferably controlled by the control unit, in particular when the brake control device is interconnected therebetween. The brake is preferably connected to the brake control device and/or the control unit via electrical brake connection lines. The components preferably comprise the brake and/or the brake control device and/or the brake connection lines. The blade angle adjustment system preferably comprises a brake current detection device, by means of which an electric brake current supplied to the brake is detected. The monitoring unit is preferably connected to the brake current detection device. In particular, the brake current is detected by means of the monitoring unit. In order to check the functionality of the brake and/or the brake control device and/or the brake connection lines in normal operation by means of the monitoring unit, the, or one of the, electric brake currents supplied to the brake and/or a temporal curve of the brake current are tested for plausibility. If the brake current and/or the curve of the brake current are not plausible, then there is an error in the brake and/or in the brake control device and/or in the brake connection lines. The blade angle position of the rotor blade is preferably checked for changes in the fixed state of the rotor blade by the brake, in order to check the functionality of the brake and/or the brake control device and/or the brake connection lines in normal operation by means of the monitoring unit, in particular by means of the rotational angle indicating device. If a change is detected in the blade angle position of the rotor blade in the fixed state of the rotor blade by the brake, then there is an error, in particular in the brake and/or in the brake control device and/or in the brake connection lines. The brake connection lines comprise, e.g., one or more current interrupting elements, e.g. protectors or relays. The brake is preferably an electro-mechanical brake. In particular, the brake is a retention brake. If there is an error in the brake and/or in the brake control device and/or in the brake connection lines, an error is preferably reported to the operation control device by means of the monitoring unit.

According to one design, the blade angle adjustment system comprises a blade angle control device and one, or at least one, blade angle adjustment device, connected in particular to the blade angle control device and/or controlled or controllable by the blade angle control device. In particular, the rotor blade can be rotated in relation to the rotor hub by means of the blade angle adjustment device, and/or the rotor blade is rotated in relation to the rotor hub, in particular by means of the blade angle adjustment device. The blade angle adjustment device is advantageously connected to the rotor blade. The blade angle adjustment device preferably comprises the emergency shutdown control signal input and/or the frequency detection device and/or the converter and/or the control unit and/or the electric motor and/or the rotation angle indicating device and/or the end switch(es) and/or the intermediate circuit voltage detection device and/or the energy storage unit current detection device and/or the brake and/or the brake current detection device and/or the monitoring unit, or a portion of the monitoring unit. In particular, the operation control device is connected to the blade angle adjustment device by the, or the at least one, emergency shutdown control line. The blade angle adjustment device can advantageously communicate with the operation control device. The blade angle control device preferably comprises the monitoring unit or one portion or another portion of the monitoring unit.

According to one design, the monitoring unit has a central processing unit, wherein the blade angle control device comprises the central processing unit. The monitoring unit advantageously has one, or at least one, sub-unit connected to the central processing unit and/or in communication therewith, wherein the blade angle adjustment device comprises the sub-unit. The sub-unit can be controlled by the central processing unit, in particular, or is controlled by it.

According to a further development, the rotor hub has numerous, preferably two or three, rotor blades rotatably mounted thereon. The rotor blades can preferably be rotated in relation to the rotor hub by means of the blade angle adjustment system, and can thus be placed in different blade angle positions, wherein control commands, preferably for positioning the rotor blades, can be or are output to the blade angle adjustment system by the operation control device, and wherein the blade angle adjustment system preferably obeys the control commands in normal operation of the wind power installation, and positions the rotor blades accordingly.

According to one design, the blade angle adjustment system comprises the, or a, blade angle adjustment device, and each rotor blade comprises a blade angle adjustment device that is connected, in particular, to the blade angle control device, and/or is controlled, or can be controlled, by the blade angle control device. Each blade angle adjustment device is advantageously designed like the blade angle adjustment device described above. In particular, each rotor blade can be rotated in relation to the rotor hub by means of the respective blade angle adjustment device, and/or each rotor blade is rotated in relation to the rotor hub by means of the respective blade angle adjustment device. Each blade angle adjustment device is advantageously mechanically connected to the respective rotor blade. The blade angle adjustment device preferably comprises an emergency shutdown control signal input and/or a frequency detection device and/or a converter and/or a control unit and/or an electric motor and/or a rotational angle indicating device and/or an intermediate circuit voltage detection device and/or an energy storage unit current detection device and/or a brake and/or a brake current detection device and/or a portion of the monitoring unit. In particular, the operation control device is connected to each blade angle adjustment device by one, or at least one, emergency shutdown control line. The blade angle control device can advantageously communicate with the operation control device. The blade angle control device preferably comprises the monitoring unit or one portion or another portion of the monitoring unit. The monitoring unit preferably has numerous sub-units connected to the central processing unit and/or in communication therewith, wherein the blade angle adjustment devices each comprise a sub-unit. In particular, each sub-unit can be or is controlled by the central processing unit.

Figure 2:
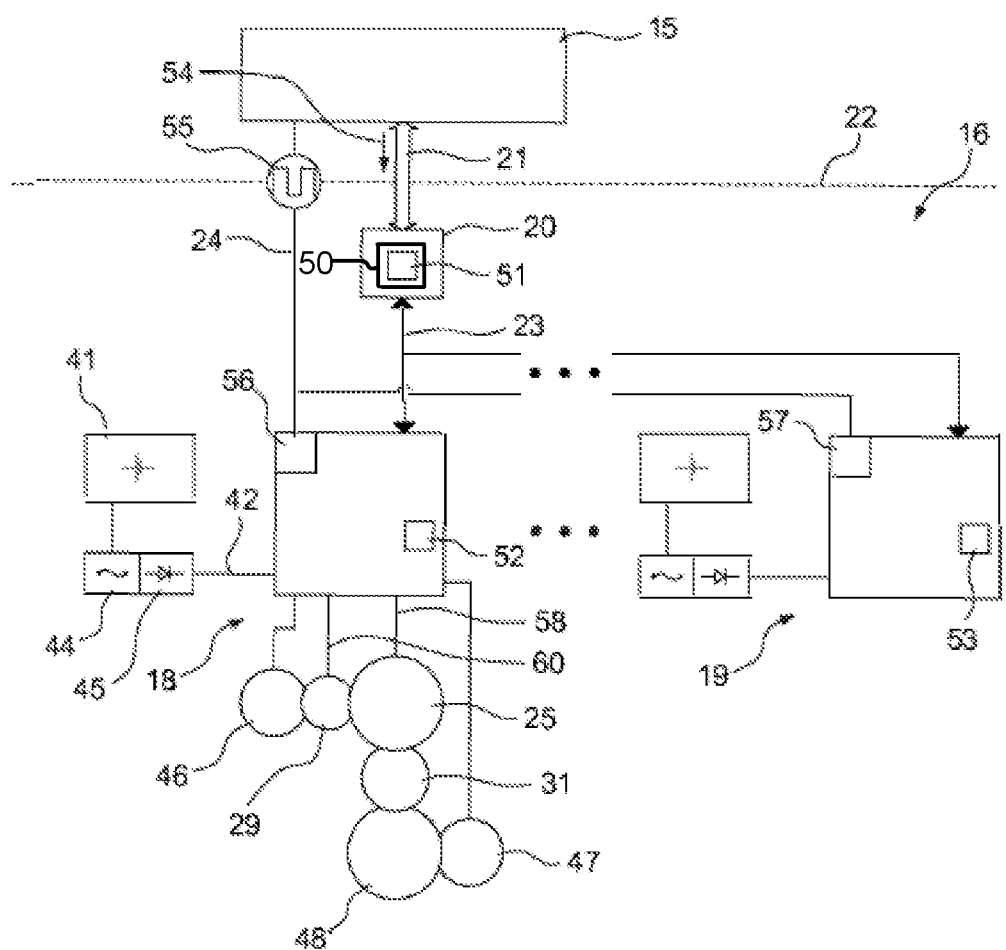
Figure 3:
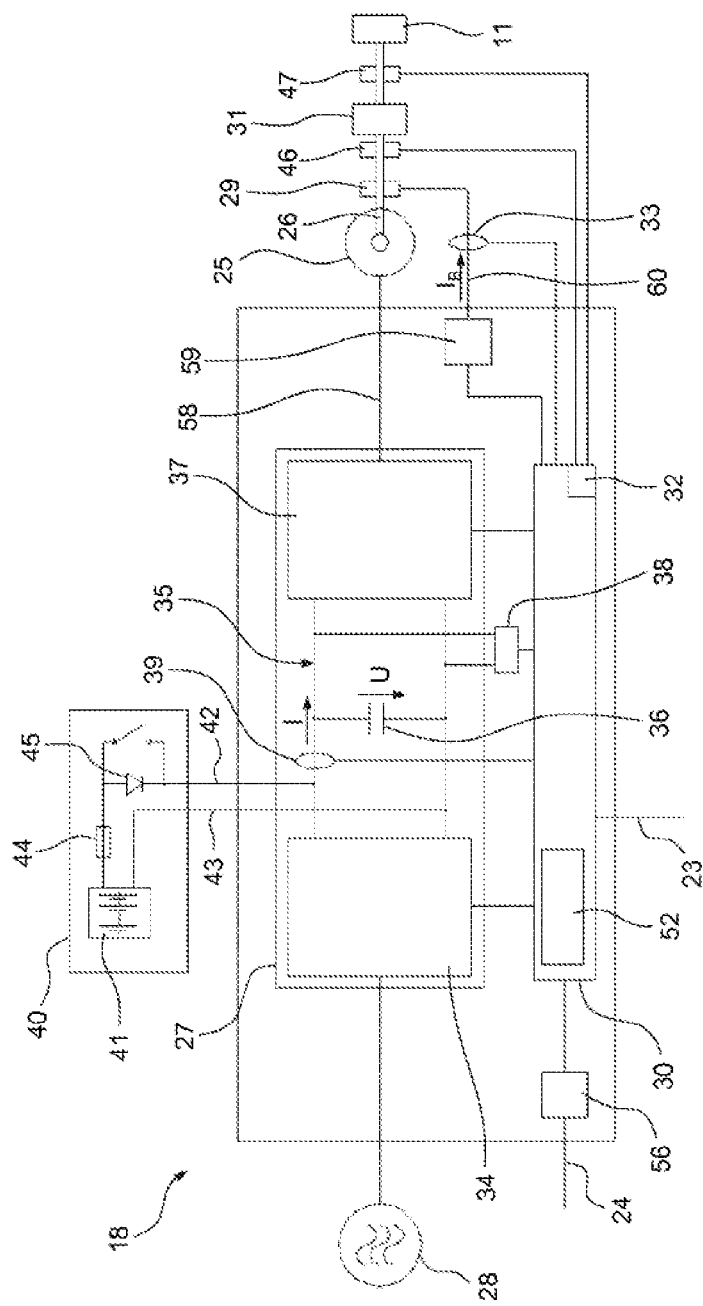
Figure 4:
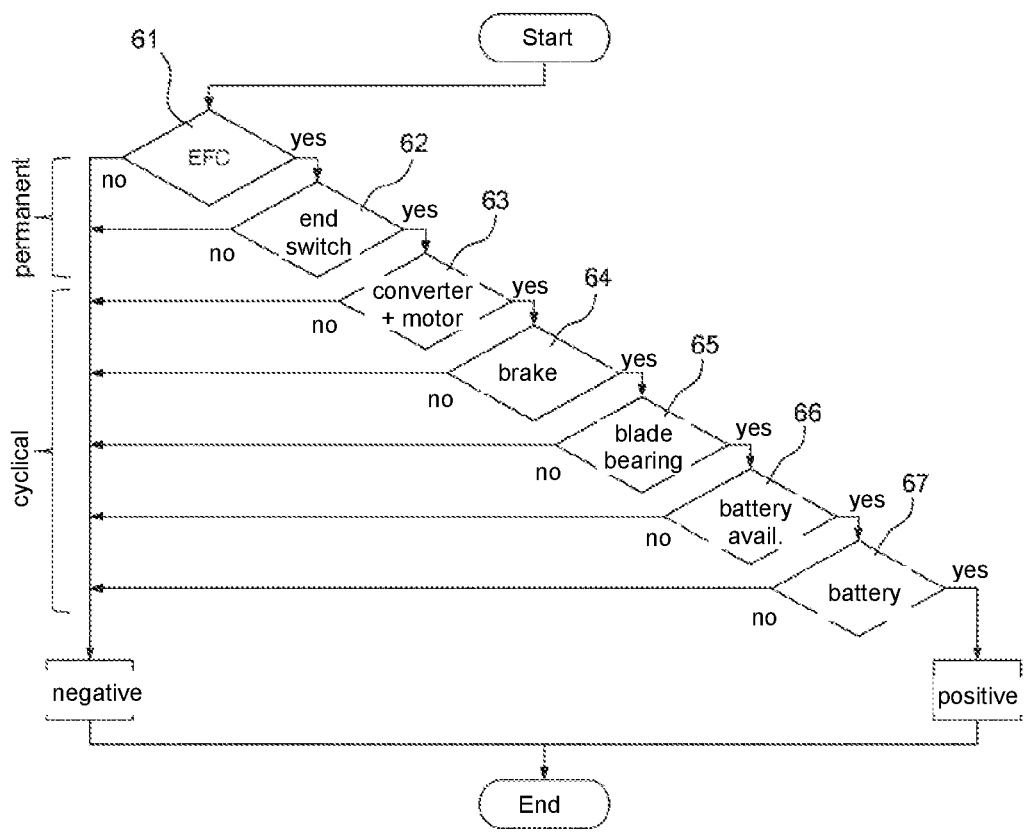

The invention shall be explained below based on a preferred embodiment with reference to the drawings. Therein:

FIG. 1 shows a schematic side view of a wind power installation according to one embodiment, FIG. 2 shows a schematic view of an operation control device and a blade angle adjustment system of the wind power installation, FIG. 3 shows a schematic view of a blade angle adjustment device of the blade angle adjustment system, and FIG. 4 shows a schematic flow chart illustrating the checking of functionality of components that can be used for an emergency shutdown of the wind power installation.

A schematic side view of a wind power installation 1 according to one embodiment is shown in FIG. 1. The wind power installation 1 comprises a tower 2, which is anchored in the ground 4 with a foundation 3. At the end away from the ground 4, a machine mount 5 is supported on the tower 2, on which a rotor 6 is mounted such that it can rotate about a rotor axis 7. Furthermore, an electric generator is attached to the machine mount 5, which is connected to the rotor 6 via a rotor shaft 9. The rotor 6 comprises a rotor hub 10 and numerous rotor blades 11 and 12, which extend away from the rotor hub 10 along a blade axis that is transverse or approximately transverse to the rotor axis. The rotor blades 11 and 12 are mounted on the rotor hub 10 such that they can rotate about their respective blade axes, wherein FIG. 1 only shows the blade axis 13 of the rotor blade 11. The rotor blades 11 and 12 are rotatably mounted on the rotor hub 10 via blade bearings 48 and 49 respectively. The machine mount 5 supports a machine housing 14, in which an operation control device 15 is disposed, which forms a higher-level control for operating the wind power installation 1. Furthermore, a blade angle adjustment system 16 is provided in the rotor hub 10, by means of which the rotor blades 11 and 12 can rotate about their respective blade axes in relation to the rotor hub 10. The rotor 6 is powered by wind 17 such that it rotates about the rotor axis 7.

A schematic view of the operation control device 15 and the blade angle adjustment system 16, which has blade angle adjustment devices 18 and 19, each of which is dedicated to one of the rotor blades 11 and 12, respectively, is shown in FIG. 2. The blade angle adjustment device 18 is dedicated to the rotor blade 11 and the blade angle adjustment device 19 is dedicated to the rotor blade 12 thereby. Furthermore, the blade angle adjustment system 16 comprises a blade angle control device 20, which is connected to the operation control device 15 via communication lines 21, and can be controlled by it. The interface between the rotor 6 and the machine mount 5 or the machine housing 14 is indicated by a broken line 22. The blade angle adjustment devices 18 and 19 are connected to the blade angle control device 20 via communication lines 23, and can be controlled by this. Additionally, the blade angle adjustment devices 18 and 19 are connected to the operation control device 15 via emergency shutdown control lines 24. The blade angle adjustment devices 18 and 19 also each have an emergency shutdown control signal input 56 and 57 respectively, to which the emergency shutdown control lines 24 are connected. Although the blade angle adjustment devices 18 and 19 are each dedicated to a different rotor blade, they are otherwise identical, such that the description shall be limited to the blade angle adjustment device 18 in the following description, which can be seen in the schematic illustration in FIG. 3.

The blade angle adjustment device 18 comprises an electric motor 25 with a motor shaft 26, a converter 27, which is connected at the input end to an electrical power supply 28 and at the output end to the electric motor 25 via motor connection lines 58, a brake control device 59, a brake 29, which can be actuated electrically, that can be controlled by the brake control device 59 and is connected thereto via brake connection lines 60, by means of which the motor shaft 26 is braked and/or can be held in place, and a control unit 30, by means of which the converter 27 can be controlled. Furthermore, the electric motor 25 can be controlled by the control unit 30, with the converter 27 interconnected therebetween. The brake control device 59 can also be controlled by means of the control unit 30. The brake control device 59 can also be integrated in the control unit 30. In particular, the brake 29 can be controlled by the control unit 30 with the brake control device 59 interconnected therebetween. The motor shaft 26 is connected to the rotor blade 11 via a gearing 31, such that it can be rotated by the electric motor 25 in relation to the rotor hub 10, and can consequently be placed in different blade angle positions. The blade angle adjustment device 18 also comprises a rotational angle indicating device 32, by means of which the blade angle position of the rotor blade 11 can be detected, and a brake current detection device 33, by means of which a brake current $I_B$ supplied to the brake 29 can be detected. The converter 27 comprises an input stage 24 connected to the electrical power supply 28, an intermediate circuit 35 connected downstream of the input stage that has an electric intermediate circuit capacitor 36, and an output stage connected downstream of the intermediate circuit 35, to which the electric motor 25 is connected. The blade angle adjustment device 18 also comprises an intermediate circuit voltage detection device 38, by means of which an intermediate circuit voltage U applied to the intermediate circuit 35 can be detected, and an intermediate circuit current detection device 39, by means of which an intermediate circuit current I flowing through the intermediate circuit 35 can be detected. The blade angle adjustment device 18 also comprises an emergency power supply device 40 with an electric energy storage unit 41 in the form of a battery, which is connected electrically to the intermediate circuit 35 via connection lines 42 and 43. A fuse 44 and a diode 45 are incorporated in the connection lines 42.

The rotational angle indicating device 32 comprises two rotational angle indicators 46 and 47, wherein the rotational angle position of the motor shaft 26 can be detected by means of the rotational angle indicator 46 and the rotational angle position of the rotor blade 11 can be detected by mean of the rotational angle indicator 47. Because the motor shaft 26 is rigidly connected to the rotor blade 11 for conjoint rotation therewith, in particular by the gearing 31 interconnected therebetween, both rotational angle positions represent the blade angle position of the rotor blade 11. The gearing 31 is gear drive, in particular. Although the rotational angle indicating device 32 according to FIG. 3 is integrated in the control unit 30, the rotational angle indicating device 32 can also be separate from the control unit 30, and connected thereto.

The blade angle adjustment system 16 has a monitoring unit 50, which comprises a central processing unit 51 integrated in the blade angle control device 20, and numerous sub-units 52 and 53, each of which is integrated in one of the blade angle adjustment devices 18 and 19. Components of the blade angle adjustment system 16 are tested for functionality by means of the monitoring unit 50 when the wind power installation is in normal operation, which are or can be used for an emergency shutdown of the wind power installation 1. This testing by the respective sub-units 52 and 53 takes place in the blade angle adjustment devices 18 and 19, wherein the tests carried out by the sub-units 52 and 53 are coordinated by the central processing unit 51. The sub-units 52 and 53 are identically structured thereby.

The term "normal operation" shall be explained in the following. When the wind power installation 1 is in operation, control commands 54 for positioning the rotor blades 11 and 12 are output to the blade angle adjustment system 16 by the operation control device 15 via communication lines 21. Normal operation is defined as being when the blade angle adjustment system 16 obeys these control commands 54, and positions the rotor blades 11 and 12 accordingly.

If, however, there is a serious error in the wind power installation 1, it must be shut down, which is also referred to as an emergency shutdown or an emergency shutdown operation. There is a serious error in particular when one of the components that is or can be used for the emergency shutdown of the wind power installation 1 malfunctions. In this case, the rotor blades 11 and 12 are rotated to a safe blade angle position, which is also referred to as a wind-vane position. Each rotor blade is rotated toward a safe blade angle position until an end switch dedicated to the safe blade angle position has been reached. A first or primary end switch for the rotor blade 11 is formed by the rotational angle indicating device 32. A second or secondary end switch is preferably also provided, which can be actuated mechanically, and in particular is slightly offset to the first end switch. The second end switch is provided in case the first end switch formed by the rotational angle indicating device 32 fails or malfunctions. The second end switch is referred to by way of example as a physical end switch. A third, or tertiary end switch is also preferably provided, which can be actuated mechanically, and is preferably slightly offset to the second end switch. The third end switch is provided in case the first and/or second end switches fail or malfunction. The third end switch is also referred to as a physical end switch, by way of example.

The emergency shutdown can be initiated in different ways. In a simple case, the operation control device 15 issues control commands 54 for positioning the rotor blades 11 and 12 in the safe blade angle position to the blade angle adjustment system 16 via the communication lines 21. This comprises a normal shut down of the wind power installation 1.

In another case, the emergency shutdown is initiated via the emergency shutdown control lines 24. In normal operation, an emergency shutdown control signal 55 (EFC) is transmitted to the blade angle adjustment devices 18 and 19 via the emergency shutdown control lines 24, which are then shut down or deactivated by the operation control device 15 in the case of an emergency shutdown. The blade angle adjustment devices 18 and 19 recognize the absence of the emergency shutdown control signal 55 and rotate the rotor blades 11 and 12 to the safe blade angle position.

In another case, the emergency shutdown is initiated by the monitoring unit 50. The monitoring unit 50 checks the functionality of components in the blade angle adjustment system that must be available for a safe emergency shutdown. If an error is detected in at least one of these components, an error notification is output to the operation control device 15 by the monitoring unit 50, which in turn causes or initiates the emergency shutdown of the wind power installation. The functionality of the emergency shutdown control lines 24 is also checked thereby. The emergency shutdown control signal 55 takes the form of a periodic signal with a defined frequency, the frequency of which is checked by the monitoring unit 50, in particular by the sub-units 51 and 52. If the frequency of the emergency shutdown control signal 55 differs from the defined frequency to more than a predefined extent, an error notification is output to the operation control device 15 by the monitoring unit 50, which in turn initiates the emergency shutdown of the wind power installation.

The emergency shutdown control signal input 56 is preferably implemented as a toggle input, as with reciprocal monitoring, in the manner of a watchdog signal. The emergency shutdown control signal 55 is also preferably a square wave signal. The normal state thus comprises the operation control device 15 sending the square wave signal 55 with the defined frequency to the emergency shutdown control signal input 56. The emergency shutdown is first triggered when a defined edge change of the emergency shutdown control signal 55 is absent.

One example of the course of the checking of functionality of the components is illustrated in FIG. 4, and shall be explained below.

The components to be checked for functionality comprise, in particular, the emergency shutdown control lines 24 and/or the emergency shutdown control signal input 56 and/or the rotational angle indicator 46 and/or the rotational angle indicator 47 and/or the converter 27 and/or the control unit 30 and/or the electric motor 25 and/or the motor connection lines 58 and/or the brake connection lines 60 and/or the brake 29 and/or the blade bearing 48 and/or the diode 45 and/or the fuse 44 and/or the connection lines 42 and 43 and/or the electric energy storage unit 41 and/or the gearing 31.

In a first step 61, the emergency shutdown control lines 24 and/or the emergency shutdown control signal input 56 are checked for functionality. Preferably, parts of the operation control device 15 are also checked for functionality, preferably indirectly by means of the watchdog or heartbeat principle. The checking in step 61 takes place in particular during or parallel to the normal operation, and in particular is permanently active and/or informative.

In a second step 62, the rotational angle indicating device 32 and/or the primary end switch formed by the rotational angle indicating device 32 are checked for functionality, which in this case corresponds in particular to the functionality and plausibility of the two rotational angle indicators 46 and 47. The checking takes place in step 62 in particular during or parallel to normal operation, and is in particular permanently active and/or providing information.

The first end switch can be configured such that it lies just in front of the second end switch, such that if the first end switch malfunctions, there are preferably two more end switches available. Another possibility is, e.g. to omit one of the physical end switches, in particular the second, in order to reduce costs.

In a third step 63, the converter 27 and/or the electric motor 25 and/or the motor connection lines 58 are checked for functionality. The control unit 30 is preferably also checked for functionality. The checking in step 63 is preferably carried out by the sub-unit 52. In particular, this checking corresponds to a checking of the converter 27 and the drive comprising the electric motor 25. The parallel checking taking place in steps 61 and 62 preferably remains active during step 63.

The sub-unit 52 checks the behavior of the drive in particular, and preferably includes all relevant internal status reports. The capacity can also be taken into account, for example, in order to avoid an overload.

The checking preferably takes place on a permanent basis, in particular as long as the blade angle adjustment system 16 is active. Alternatively, the checking takes place on a cyclical basis, and is initiated or triggered, for example, by the central processing unit 51.

In a fourth step 64, the brakes 29 and/or the brake connection lines 60 are checked for functionality. The checking in step 64 is preferably executed by the sub-unit 52. In addition, or alternatively, this checking can also be initiated or triggered cyclically by the central processing unit 51. The functionality of the brake 29 is preferably checked in the following manner:
a) by detecting the brake current $I_B$ and checking it for plausibility.
b) by detecting the blade angle position and/or the rotational angle position of the motor shaft, as long as the rotor blade is secured or held in place by the brake 29.

c) by determining the brake torque, in that a constantly increasing torque is applied by the electric motor 25 to the engaged brakes 29, until the defined brake torque is reached. The rotational angle position or the rotational rate of the motor shaft is used in particular as an indicator of whether or not the brake 29 holds. The different approaches a) to c) can also be combined with one another.

In a fifth step 65, the blade bearing 48 and/or the gearing 31 are checked for functionality. The following components are preferably included thereby: the rotational angle indicator 46 and/or the rotational angle indicator 47 and/or the converter 27 and/or the control unit 30 and/or the electric motor 25 and/or the motor connection lines 58 and/or the brake connection lines 60 and/or the brakes 29 and/or the diode 45 and/or the fuse 44 and/or the connecting lines 42 and 43 and/or the electric energy storage unit 41.

In particular, this concerns the power transmission train, comprised of a gearing and/or clutch and/or motor shaft and/or pinion and/or blade bearing. The checking in step 65 is preferably carried out by the sub-unit 52. The checking preferably takes place on a permanent basis, in particular as long as the blade angle adjustment system 16 is active, and the rotor blade 11 is rotated. The checking can also be initiated or triggered cyclically by the central processing unit 51, however, e.g. if the blade angle adjustment system 16 is not used for longer periods of time, but a report is to be generated. In this case, the rotor blade 11 is preferably rotated over a predefined, in particular acceptable, test angle.

In a sixth step 66, the electric energy storage unit 41 and/or the diode 45 and/or the fuse 44 and/or the connection lines 42 and 43 are checked for functionality, in particular by reducing the intermediate circuit voltage U to a testing voltage, which is lower than a predefined minimum voltage of the energy storage unit. This preferably includes the following components: the rotational angle indicator 46 and/or the rotational angle indicator 47 and/or the converter 27 and/or the control unit 30 and/or the electric motor 25 and/or the motor connection lines 58 and/or the brake connection lines 60 and/or the brake 29 and/or the blade bearing 48 and/or the gearing 31.

A conclusion is first drawn based on the checking in step 66, regarding whether the emergency power supply device 40 and/or the electric energy storage unit 41 are fundamentally available (battery operation). In particular, however, no conclusion is reached yet regarding the SoC of the energy storage unit 41. The checking in step 66 preferably takes place on a cyclical basis, and is triggered or initiated in particular by the central processing unit 51.

In a seventh step 67, the electric energy storage unit 41 is also checked for functionality, in particular with defined loads to the energy storage unit 41 by the electric motor 25. The quality of the electric energy storage unit 41 is preferably assessed, in particular in that the energy quantity and/or the current load and/or the change in voltage of the electric energy storage unit 41 is determined during the checking in step 67, and used as a basis for the assessment. A conclusion can thus be drawn as to whether the available energy is sufficient for an emergency shutdown. In particular, the SoC and/or the SoH of the energy storage unit 41 are determined. The checking in step 67 preferably takes place cyclically, and is triggered or initiated in particular by the central processing unit 51.

Steps 61 to 67 are preferably carried out successively, in particular in the given sequence. Alternatively, steps 63 to 67 are carried out successively, in particular in the given sequence, while steps 61 and 62 are carried out continuously.

The steps can, however, also be carried out in another sequence. It is also possible to omit one or more of the steps 61 to 67 and/or add one or more other steps.

The invention claimed is:

1. A wind power installation comprising:
   a rotor that can be rotated by wind power, which has a rotor hub and at least one rotor blade rotatably mounted thereon,
   a higher-level operation control device;
   a blade angle adjustment system having a blade angle adjustment device, and being in communication with the operation control device via a first communication line through a communication line input, and which has components used for carrying out an emergency shutdown of the wind power installation in accordance with a first emergency shutdown condition, by means of which the rotor blade can be rotated via signals communicated over the first communication line in relation to the rotor hub, and can thus be placed in different blade angle positions,
   wherein control commands for positioning the rotor blade can be output to the blade angle adjustment device of the blade angle adjustment system by the operation control device, and the blade angle adjustment device obeys the control commands in a normal operation of the wind power installation, and positions the rotor blade accordingly,
   wherein the blade angle adjustment system also has a monitoring unit configured to be run in parallel with the operation control device during the normal operation, by means of which the functionality of the, or a portion of the, components can be checked without accessing the operation control device, and a second emergency shutdown condition initiated by the monitoring unit when a functionality of one or more components of the wind power installation is detected as malfunctioning, by which the monitoring unit sends signals to the operation control device, which the operation control device responds to by sending shutdown control signals over a shutdown control line to a separate shutdown control signal input of the blade angle adjustment device, to thus carry out the second emergency shutdown conditions.

2. The wind power installation according to claim 1, characterized in that the operation control device is connected to the blade angle adjustment system by at least one emergency shutdown control line, via which at least one periodic emergency shutdown control signal with a defined frequency can be output to the blade angle adjustment system by the operation control device, wherein the components comprise the emergency shutdown control line and at least the frequency of the emergency shutdown control signal are checked by means of the monitoring unit for checking the functionality of the emergency shutdown control line, while the control device controls the wind power installation during normal operation, to determine if the second emergency shutdown condition exists.

3. The wind power installation according to claim 1, characterized in that the blade angle adjustment system comprises at least one converter, at least one electric motor connected downstream of the converter and connected mechanically to the rotor blade, and at least one rotational angle indicating device, by means of which the blade angle position of the rotor blade is detected.

4. The wind power installation according to claim 3, characterized in that the components comprise the converter and the electric motor, and the blade angle position of the rotor blade is checked for changes in order to check the functionality of the converter and the electric motor in normal operation by means of the monitoring unit.

5. The wind power installation according to claim 3, characterized in that the rotational angle indicating device comprises at least two different rotational angle indicators, by means of which the blade angle position of the rotor blade can be checked independently of one another, wherein the components comprise the rotational angle indicating device and the rotational angle positions detected by the two different rotational angle indicators can be checked for plausibility in order to check the functionality of the rotational angle indicating device in normal operation by means of the monitoring unit.

6. The wind power installation according to claim 3, characterized in that the converter comprises an input stage connected to an electrical power supply, an intermediate circuit connected downstream of the input stage, and an output stage connected downstream of the intermediate circuit, to which the electric motor is connected, and the blade angle adjustment system comprises at least one electric energy storage unit connected to the intermediate circuit and an intermediate circuit voltage detection device, by means of which an intermediate circuit voltage (U) applied to the intermediate circuit can be detected, wherein the components comprise the energy storage unit and the input stage can be activated to reduce an intermediate circuit voltage (U) from an intermediate circuit nominal voltage to a lower testing voltage, which is lower than a minimum voltage assigned to the energy storage unit, in order to check the functionality of the energy storage unit in normal operation by means of the monitoring unit, and the intermediate circuit voltage (U) can be compared to the minimum voltage.

7. The wind power installation according to claim 6, characterized in that the testing voltage is also high enough to operate the converter and the electric motor when the testing voltage is applied to the intermediate circuit.

8. The wind power installation according to claim 6, characterized in that the blade angle adjustment system comprises an energy storage unit current detection device, by means of which an electric energy storage unit current (I) output by the energy storage unit can be detected, wherein the output stage can be activated such that the energy storage unit can be electrically loaded via the converter by the electric motor, while the input stage is activated by the monitoring unit to reduce the intermediate circuit voltage (U) to the testing voltage, the discharging of the energy storage unit can be observed, at least one datum characteristic of the current state of the electric energy storage unit can be obtained from the observation of the discharge, and the current state of the energy storage unit can be compared with the predefined requirements for its state, for a supplementary checking of the functionality of the energy storage unit in normal operation by means of the monitoring unit.

9. The wind power installation according to claim 8, characterized in that one or more electric motor voltages applied to the electric motor can be modulated by means of the monitoring unit such that a defined electric load to the energy storage unit can be obtained without, or without substantial, changes to a current mechanical performance output by the electric motor.

10. The wind power installation according to claim 1, characterized in that the blade angle adjustment system comprises at least one brake that can be actuated electrically, by means of which the rotor blade can be fixed in place, or braked, with regard to a rotation in relation to the rotor hub, and a brake current detection device, by means of which an electric brake current ($I_B$) supplied to the brake can be detected, wherein the components comprise the brake, and the brake current ($I_B$) can be checked for plausibility by means of the monitoring unit to check a functionality of the brake.

11. A method for checking a functionality of components that can be used for an emergency shutdown of a wind turbine power installation, which has a rotor that can be rotated by wind power, which has a rotor hub and at least one rotor blade rotatably supported thereon, a higher level operation control device, and a blade angle adjustment system having a blade angle adjustment device and being in communication therewith and comprising the components, by means of which the rotor blade can be rotated in relation to the rotor hub, and can thus be placed in different positions, wherein control commands for positioning the rotor blade are output to the blade angle adjustment system by the operation control device over a first communication line through a communication line input, and the blade angle adjustment system obeys the control commands in a normal operation of the wind power installation, and positions the rotor blade accordingly, characterized in that the blade angle adjustment system also has a monitoring unit running in parallel with the operation control device during the normal operation of the wind power installation, by means of which the functionality of the components, or a portion thereof, is checked without accessing the operation control device, and an emergency shutdown condition is initiated by the monitoring unit when a functionality of one or more components of the wind power installation is detected as malfunctioning, by which the monitoring unit sends signals to the operation control device, which the operation control device responds to by sending signals over a separate shutdown control line to a separate shutdown control signal input of the blade angle control device, in controlling operation of the rotor blade and carrying out the emergency shutdown condition.

12. The method according to claim 11, characterized in that the operation control device is connected to the blade angle adjustment system by at least one emergency shutdown control line, via which at least one periodic emergency control signal with a defined frequency is output to the blade angle adjustment system by the operation control device, wherein the components comprise the emergency shutdown control line, and at least the frequency of the emergency shutdown control signal is checked by means of the monitoring unit in order to check the functionality of the emergency shutdown control line in normal operation.

13. The method according to claim 11, characterized in that the blade angle adjustment system comprises at least one converter, at least one electric motor connected downstream of the converter and mechanically connected to the rotor blade, and at least one rotational angle indicating device, by means of which the blade angle position of the rotor blade is detected.

14. The method according to claim 13, characterized in that the components comprise the converter and the electric motor and the blade angle position of the rotor blade is checked for changes in order to check the functionality of the converter and the electric motor in normal operation by means of the monitoring unit.

15. The method according to claim 13, characterized in that the rotational angle indicating device comprises at least two different rotational angle indicators, by means of which the blade angle position of the rotor blade is detected independently of one another, wherein the components comprise the rotational angle indicating device and the rotational angle positions detected by the two different rotational angle indicators are checked for plausibility in order to check the functionality of the rotational angle indicating device in normal operation by means of the monitoring unit.

16. The method according to any of the claim 13, characterized in that the converter comprises an input stage connected to an electrical power supply, an intermediate circuit connected downstream of the input stage, and an output stage connected downstream of the intermediate circuit, to which the electric motor is connected, and the blade angle adjustment system comprises at least one electric energy storage unit connected to the intermediate circuit and an intermediate circuit voltage detection device, by means of which an electric intermediate circuit voltage (U) applied to the intermediate circuit is detected, wherein the components comprise the energy storage unit and the input stage is activated to reduce the intermediate circuit voltage (U) from an intermediate circuit nominal voltage to a lower testing voltage that is lower than a minimum voltage assigned to the energy storage unit, and the intermediate circuit voltage (U) is compared with the minimum voltage in order to check the functionality of the energy storage unit in normal operation by means of the monitoring unit.

17. The method according to claim 16, characterized in that the testing voltage is high enough that the converter and the electric motor can also be operated with the testing voltage applied to the intermediate circuit.

18. The method according to claim 16, characterized in that the blade angle adjustment system comprises an energy storage unit current detection device, by means of which an electric energy storage unit current (I) output by the energy storage unit is detected, wherein the output stage is activated such that the energy storage unit is electrically loaded with the electric motor via the converter, while the input stage is activated by the monitoring unit to reduce the intermediate circuit voltage (U) to the testing voltage, the discharge of the energy storage unit is observed, at least one datum is obtained from the observation of the discharge that is characteristic of the current state of the electric energy storage unit, and the current state of the energy storage unit is compared with the predefined requirements for this state, for a supplementary check of the functionality of the energy storage unit in normal operation by means of the monitoring unit.

19. The method according to claim 18, characterized in that one or more electric motor voltages applied to the electric motor can be modulated by means of the monitoring unit such that a defined electric load to the energy storage unit can be obtained without changes to a mechanical performance currently output by the electric motor.

20. The method according to claim 11, characterized in that the blade angle adjustment system comprises at least one brake that can be actuated electrically, by means of which the rotor blade can be fixed in place or braked with regard to a rotation in relation to the rotor hub, and a brake current detection device, by means of which an electric brake current ($I_B$) supplied to the brake can be detected, wherein the components comprise the brake, and the brake current ($I_B$) is checked for plausibility in order to check the functionality of the brake by means of the monitoring unit.

* * * * *